(12) United States Patent
Nagata

(10) Patent No.: US 8,891,196 B2
(45) Date of Patent: Nov. 18, 2014

(54) METHOD OF READING AND WRITING MAGNETIC RECORDING MEDIUM

(71) Applicant: Fuji Electric Co., Ltd., Kawasaki (JP)

(72) Inventor: Naruhisa Nagata, Kedah Darul Aman (MY)

(73) Assignee: Fuji Electronic Co., Ltd., Kawasaki-shi (JP)

( * ) Notice: Subject to any disclaimer, the term of this patent is extended or adjusted under 35 U.S.C. 154(b) by 0 days.

(21) Appl. No.: 14/169,484

(22) Filed: Jan. 31, 2014

(65) Prior Publication Data

US 2014/0218820 A1 Aug. 7, 2014

(30) Foreign Application Priority Data

Feb. 1, 2013 (JP) ................. 2013-018842

(51) Int. Cl.
*G11B 21/02* (2006.01)
*G11B 5/012* (2006.01)

(52) U.S. Cl.
CPC ..................................... *G11B 5/012* (2013.01)
USPC ........................................................... 360/75

(58) Field of Classification Search
None
See application file for complete search history.

(56) References Cited

U.S. PATENT DOCUMENTS

| 5,835,305 | A | * | 11/1998 | Hamaguchi et al. | ........ 360/234.1 |
| 8,623,800 | B2 | * | 1/2014 | Ooeda et al. | ................... 508/582 |
| 2003/0099054 | A1 | | 5/2003 | Kamijima | |
| 2003/0123171 | A1 | * | 7/2003 | Smith et al. | ..................... 360/31 |
| 2007/0298982 | A1 | * | 12/2007 | Shimokawa | ................... 508/182 |
| 2012/0194944 | A1 | * | 8/2012 | Ikai et al. | ......................... 360/75 |

FOREIGN PATENT DOCUMENTS

JP 2003-168274 A 6/2003

* cited by examiner

*Primary Examiner* — Andrew L Sniezek
(74) *Attorney, Agent, or Firm* — Rabin & Berdo, P.C.

(57) ABSTRACT

A method of reading and writing a magnetic recording medium using a magnetic head that has an element portion, the magnetic recording medium including a base, a metal film formed on the base, a protective film formed on the metal film, and a lubricating film formed on the protective film. The method includes reading and writing the magnetic recording medium while positioning the element portion of the magnetic head in the lubricating film.

5 Claims, 1 Drawing Sheet

METHOD OF READING AND WRITING MAGNETIC RECORDING MEDIUM

CROSS REFERENCE TO RELATED APPLICATION

This application claims the priority of Japanese patent application Serial No. JP PA 2013-018842, filed Feb. 1, 2013, the entire contents of which is hereby incorporated by reference.

BACKGROUND OF THE INVENTION

1. Field of the Invention

This invention relates to a method of reading and writing a magnetic recording medium.

2. Description of the Related Art

In order to raise the recording density of a hard disk drive (HDD), in addition to improving the magnetic recording layer, the distance between the magnetic head which performs information reading and writing and the magnetic recording layer (the magnetic spacing) must be made as small as possible. To this end, the protective film formed on the magnetic recording layer is made thinner, the lubricating film formed on the protective film is made thinner, and the flying height of the magnetic head from the lubricating film surface is reduced. In recent HDDs, rather than reducing the flying height of the magnetic head from the lubricating film surface, magnetic heads are being used in which a technique is applied to bring only the element portion of the magnetic head close to the medium by means of thermal expansion, to lower the effective flying height (the distance from the protective film surface to the element portion of the magnetic head). This technique has been called the dynamic flying height (DFH) technique, thermal flying height control (TFC) technique, flying on demand (FOD) technique, and similar (see for example Japanese Patent Application Laid-open No. 2003-168274).

However, at present the protective film thickness, lubricating film thickness, and effective flying height are each several nm or less in magnitude, and further reduction of the thickness of the protective film may result in poorer corrosion resistance, while a thinner lubricating film may cause worsened durability, and reducing the effective flying height may lead to instability in head flight characteristics.

Hence an object of the present invention is to provide a method of reading and writing a magnetic recording medium to achieve further reduction of the magnetic spacing and improved electromagnetic transducing characteristics, without impairing head-disk interface (HDI) reliability as represented by corrosion resistance, durability, and head flight characteristics.

SUMMARY OF THE INVENTION

In order to attain the above object, the present invention provides the following means.

A reading and writing method is characterized in that, in a magnetic read-write device having a magnetic head and a magnetic recording medium having a base, a metal film formed on the base, a protective film formed on the metal film, and a lubricating film formed on the protective film, an element portion of the magnetic head is operated to be positioned in the lubricating film during reading and writing the magnetic medium.

In the reading and writing method, it is preferable that the magnetic head have an acoustic emission (AE) element, and that by means of an AE signal obtained from the AE element, whether the element portion of the magnetic head is in contact with the surface of the lubricating film, or is positioned in the lubricating film, or is in contact with the surface of the protective film, be detected, and a distance between the element portion and the surface of the lubricating film, when the element portion of the magnetic head is positioned in the lubricating film, be obtained.

In the reading and writing method, it is preferable that the film thickness of the lubricating film be 0.7 nm or greater and 1.8 nm or less.

In the reading and writing method, it is preferable that the distance between the element portion and the protective film surface, when the element portion of the magnetic head is positioned in the lubricating film, be 0.4 nm or greater and 0.8 nm or less.

In the reading and writing method, it is preferable that the magnetic head have a function of protruding the element portion of the magnetic head.

By means of the present invention, a method of reading and writing a magnetic recording medium can be provided which achieves further reduction of the magnetic spacing and improved electromagnetic transducing characteristics, without impairing HDI reliability such as corrosion resistance, durability, and head flight characteristics.

BRIEF DESCRIPTION OF THE DRAWINGS

FIG. 1 is a summary cross-sectional view of the magnetic head and magnetic recording medium of a practical example of the present invention, wherein

DESCRIPTION OF THE PREFERRED EMBODIMENTS

Figure 1A:
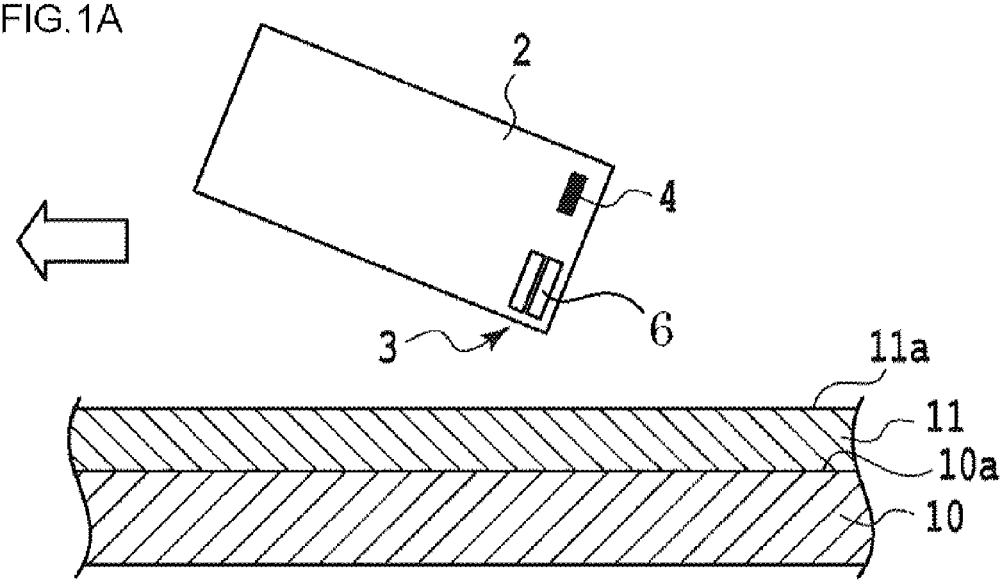
FIG. 1A shows a case in which the element portion of the magnetic head is not protruding.

A magnetic read-write device used in the present invention principally is formed of a magnetic recording medium and a magnetic head. The magnetic recording medium has a base, a metal film or similar formed on the base, a protective film formed on the metal film or similar, and a lubricating film formed on the protective film. During reading and writing, an element portion of the magnetic head is positioned within the lubricating film. Details are described below.

The substrate for film deposition on which the protective film is formed, is formed by stacking a metal film layer and the like on a base. The metal film layer and the like formed on the base includes at least a magnetic recording layer. Optionally, a nonmagnetic underlayer, soft magnetic layer, seed layer, intermediate layer, and other layers may be further included between the magnetic recording layer and the base. In the practical examples explained below, a substrate for film deposition was formed by depositing, on an aluminum alloy base of a diameter of 95 mm and a thickness of 1.75 mm on which Ni—P plating has been performed, an underlayer, intermediate layer, and magnetic recording layer.

It is preferable that the base be nonmagnetic, and any material normally used in the manufacture of a magnetic recording medium can be used. For example, in addition to an aluminum alloy on which Ni—P plating has been performed, glass, ceramics, plastics, silicon, or other materials can be used to manufacture the base.

The magnetic recording layer can be formed using a ferromagnetic alloy material containing Co and Pt. The easy axis of magnetization of the ferromagnetic material must be oriented in the direction in which magnetic recording is performed. For example, in order to perform perpendicular magnetic recording, the easy axis of magnetization of the magnetic recording layer must be oriented in the direction perpendicular to the recording medium surface (that is, the principal plane of the base).

Or, it is preferable that a material having a granular structure, in which magnetic crystal grains are dispersed in a matrix of a nonmagnetic oxide or a nonmagnetic nitride, be used to form a perpendicular magnetic recording layer comprising a single layer or multiple layers. Materials having a granular structure which can be used include $CoPt$—$SiO_2$, $CoCrPtO$, $CoCrPt$—$SiO_2$, $CoCrPt$—$TiO_2$, $CoCrPt$—$Al_2O_3$, $CoPt$—$AlN$, $CoCrPt$—$Si_3N_4$, and similar, but are not limited to these. In the present invention, by using a material having a granular structure, improvements in medium characteristics, such as promotion of magnetic isolation between magnetic crystal grains in proximity in the perpendicular magnetic recording layer, noise reduction, improvement of the signal-to-noise ratio (SNR), and enhanced recording resolution, become possible.

A nonmagnetic underlayer which may optionally be provided can be formed using Ti or using a nonmagnetic material including Cr such as a CrTi alloy.

A soft magnetic layer which may optionally be provided can be formed using FeTaC, Sendust (FeSiAl) alloy, or other crystalline materials, or microcrystalline materials such as FeTaC, CoFeNi, and CoNiP, or amorphous materials containing Co such as CoZrNd, CoZrNb, and CoTaZr. A soft magnetic layer has the function in a perpendicular magnetic recording medium of concentrating the perpendicular-direction magnetic field generated by the magnetic head in the magnetic recording layer. The optimum value for the film thickness of a soft magnetic layer varies with the structure and characteristics of the magnetic head used for writing, but in consideration of a balance with productivity, a value of approximately 10 nm or greater and 500 nm or less is preferable.

A seed layer which may optionally be provided can be formed using NiFeAl, NiFeSi, NiFeNb, NiFeB, NiFeNbB, NiFeMo, NiFeCr, or another Permalloy based material, or using Co or a Permalloy based material with Co further added such as CoNiFe, CoNiFeSi, CoNiFeB, and CoNieFeNb, or a Co based alloy such as CoB, CoSi, CoNi, and CoFe. It is preferable that a seed layer have a film thickness adequate to control the crystal structure of the magnetic recording layer, and in normal cases, a film thickness of 3 nm or greater and 50 nm or less is preferable.

An intermediate layer which may optionally be provided can be formed using Ru or an alloy the main component of which is Ru. An intermediate layer normally has a film thickness of 0.1 nm or greater and 20 nm or less. By using a film thickness in this range, characteristics necessary for high-density recording can be imparted to the magnetic recording layer without degrading the magnetic characteristics or electromagnetic transducing characteristics of the magnetic recording layer.

Formation of a nonmagnetic underlayer, soft magnetic layer, seed layer, intermediate layer, and the magnetic recording layer can be performed using an arbitrary method known in the art, such as a sputtering method (including DC magnetron sputtering, RF magnetron sputtering, and similar), a vacuum evaporation deposition method, and similar.

The protective film is a film used to protect the magnetic recording layer from corrosion and from shocks upon contact with the magnetic head. The protective layer can be formed using a material routinely used in the field of magnetic recording media (carbon based materials and similar). Amorphous carbon films are preferable, and diamond like carbon (DLC) and similar is used. However, the protective film is not limited to amorphous material, and needs not be a single layer, but may have a stacked structure. Stacked structure protective films may for example be stacked structures of two types of carbon based materials with different characteristics, or stacked structures of a metal and a carbon based material, or stacked structures of a metal oxide film and a carbon based material. The protective film can be formed using a plasma chemical vapor deposition (CVD) method, a sputtering method, a vacuum evaporation deposition method, or another arbitrary method known in the art.

When using a plasma CVD method to form the protective film, a hydrocarbon gas such as ethylene, acetylene, methane, benzene, or similar can be used as the starting material gas. Power for plasma generation may be supplied by a capacitive coupling method, or by an inductive coupling method. As the power supplied, DC power, HF power (at frequencies from several tens to several hundreds of kilohertz), RF power (at frequencies of 13.56 MHz, 27.12 MHz, 40.68 MHz, and similar), microwaves (frequency 2.45 GHz), and similar can be used. As the plasma generation apparatus, a parallel plate type apparatus, filament type apparatus, ECR plasma generation apparatus, helicon wave plasma generation apparatus, or similar can be used. In the present invention, it is preferable that a filament type plasma CVD apparatus be used. In the practical examples described below, a filament type plasma CVD apparatus was used to supply a prescribed current to a cathode filament and cause emission of thermal electrons while introducing ethylene gas into the apparatus, to generate ethylene plasma.

A bias voltage may be applied to the base and metal film layer or other stacked member used as the substrate for film deposition to promote accumulation of a DLC film. For example, −40 to −120 V can be applied to the substrate for film deposition. In the practical examples described below, a substrate bias is used to draw film deposition species to the substrate for film deposition and form a DLC film; at this time the anode potential is +60 V and the substrate bias potential is −120 V.

It is preferable that the film thickness of the protective film be 1.2 nm or greater and 2.5 nm or less. If the film thickness of the protective film is less than 1.2 nm, there is the problem that corrosion resistance is worsened, and if the film thickness of the protective film exceeds 2.5 nm, the magnetic spacing loss with the magnetic head is increased, and the electromagnetic transducing characteristics are worsened.

In another plasma CVD apparatus of the same type as the plasma CVD apparatus described above, with a nitrogen gas flow rate at 50 sccm, a tetrafluoromethane gas flow rate at 40 sccm, and over a processing time of 1.0 second, nitriding treatment and fluoriding treatment of the surface of the DLC film may be performed. By nitriding or fluoriding the surface of the protective film in this way, affinity with the lubricating film and lubricating properties of the protective film can be improved, and the head flying characteristics and durability can be enhanced.

The lubricating film can be formed using a material routinely used in the field of magnetic recording media (for example, a perfluoro polyether based lubricant (Fomblin (registered trademark) Z-dol, Fomblin (registered trademark) Z-tetraol, or similar).

A lubricating film is formed by using a dip method to apply a liquid lubricant, the principal part of which is a perfluoro polyether, onto the protective film. However, the method of formation is not limited to this, and the film can be formed using a spin-coating method or other application methods. It is preferable that the film thickness of the lubricating film be 0.7 nm or greater and 1.8 nm or less. If the film thickness of the lubricating film is less than 0.7 nm, there is the problem that corrosion resistance and durability are worsened, and if the film thickness of the lubricating film exceeds 1.8 nm, the uniformity of the film thickness of the lubricating film is hindered, and magnetic head flight (traveling) becomes unstable. Further, the magnetic spacing between the magnetic head and the magnetic recording layer is increased, and the electromagnetic transducing characteristics are worsened.

Reading and Writing Method

Next, a reading and writing method is described.

A magnetic head principally comprises a slider and an element portion embedded therein. The head is miniaturized, and as the slider a pico-size slider of a length of approximately 1.2 mm, or a femto-size slider smaller than this, can be used. As the HDD writing and reading method, writing using an inductive type element and reading using a magnetoresistance type element, or similar can be used; the element portion of the magnetic head may have a write element and a read element. As the read element, a giant magneto-resistive effect (GMR) element, a tunnel magneto-resistive effect (TMR) element, or similar can be used. These elements are formed in the slider or mounted thereupon.

Figure 1B:
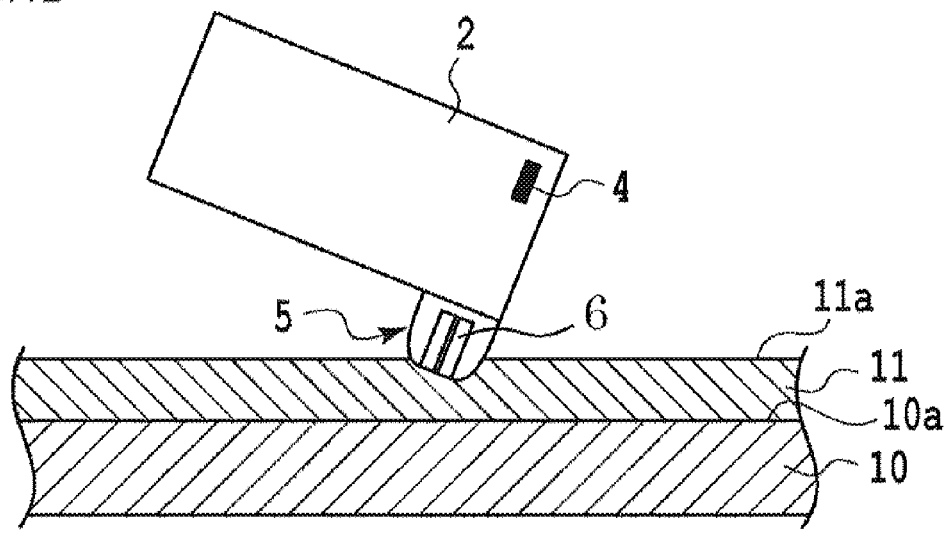
FIG. 1B shows a case in which the element portion of the magnetic head is protruding.

Using a technique called FOD and similar, for protruding the element portion of a magnetic head and controlling the effective flying height, reading and writing are performed using a magnetic head having an acoustic emission (AE) element 6. A summary view of the magnetic head used appears in FIGS. 1A and 1B. The element portion 3 is present on a tip of the slider 2 of the magnetic head, and a heater 4 is provided in proximity to the element portion 3. In operation, the slider 2 is positioned over a magnetic recording medium including a protective film 10 with a protective film surface 10a, on to of which is a lubricating film 11 with a lubricating film surface 11a. By applying power to the heater 4, the element portion is made to protrude due to thermal expansion, and a protruding element portion 5 results. The slider 2 of the magnetic head is a femto-size slider of a size for example less than 1 mm by 1 mm, and the slider protective film of the magnetic head was of tetrahedral amorphous carbon (ta-C). The protruding element portion 5 is made to operate as follows. As indicated in FIGS. 1A and 1B, by applying power to the heater 4 of the magnetic head, heat is generated, and thermal expansion causes the element portion 3 of the magnetic head to protrude. By adjusting this power, the amount of protrusion is adjusted.

In order to position the element portion of the magnetic head in the lubricating film, the depth of immersion of the element portion of the magnetic head in the lubricating film 11 is controlled as follows. The depth of immersion is the distance of the element portion from the surface of the lubricating film in a case where the element portion of the magnetic head is positioned in the lubricating film 11, and is the distance of the lower end of the element portion from the surface 11a of the lubricating film. First, position of the element portion of the magnetic head is determined, judging whether the element portion of the magnetic head has detected either the lubricating film surface or the protective film surface. The magnetic recording medium is rotated, and after reaching a rotation rate of 7200 rpm, the element portion of the magnetic head is protruded using the FOD. It is sufficient that the rotation rate be a prescribed rotation rate, and no limitations in particular are imposed. When the intensity of the AE signal obtained from the AE element mounted on the magnetic head begins to gently rise, the element portion of the magnetic head is taken to be at the position in contact with the lubricating film. This is the case when the portion of the element portion closest to the surface of the lubricating film of the medium is in contact with the surface of the lubricating film. Further, when the element portion of the magnetic head protrudes outward, and the intensity of the AE signal rises sharply, the element portion of the magnetic head is taken to be at the position in contact with the protective film. The film thickness of the lubricating film is known, and thus the amount of protrusion of the element portion of the magnetic head is adjusted by adjusting the power applied to the heater in proximity to the element portion of the magnetic head on the basis of the AE signal, and the depth of the element portion immersed in the lubricating film can be controlled. Specifically, when the intensity of the AE signal has exceeded a certain upper limit, the element portion of the magnetic head is regarded as being at a position in proximity to the surface of the protective film. In this case, the power applied to the heater is reduced, to reduce the amount of protrusion. Or, when the intensity of the AE signal has fallen below a certain lower limit, the element portion of the magnetic head is regarded as not being in contact with the lubricating film. In this case, the power applied to the heater in proximity to the element portion of the magnetic head is increased, and the amount of protrusion is increased. By this means, the immersion depth of the element portion of the magnetic head in the lubricating film can be controlled. Further, by performing PID control on the basis of the AE signal, the immersion depth of the element portion of the magnetic head in the lubricating film can be controlled. The state of immersion in the lubricating film of the element portion of the magnetic head is a state of being positioned in the lubricating film, and continues from the start of the gentle rise in intensity of the AE signal when FOD is used to protrude the element portion (the state in which the element portion is in contact with the surface of the lubricating film), during further protrusion of the element portion, until the intensity of the AE signal sharply rises (the state of making contact with the protective film), and is a state in which the element portion is immersed in the lubricating film, but is not in contact with either the surface of the lubricating film or the with the protective film.

PRACTICAL EXAMPLES

Practical Example 1

Below, the present invention is explained still more specifically through practical examples.

Method of Manufacturing Media

On the surface of a ring-shape aluminum disk having an outer diameter of 95 mm, an inner diameter of 25 mm and a thickness of 1.27 mm, Ni—P plating was formed to a film thickness of 12 µm, to prepare a nonmagnetic base. The nonmagnetic base thus obtained was subjected to smoothing and cleaning.

A DC magnetron sputtering method was used to form a metal film on the cleaned nonmagnetic base. First, $Cr_{50}Ti_{50}$ was stacked to form a nonmagnetic underlayer having a film thickness of 6.0 nm.

Next, a DC magnetron sputtering method was used to form a CoZrNb film having a film thickness of 20 nm on the nonmagnetic underlayer as a soft magnetic layer.

Next, a DC magnetron sputtering method was used to form a CoNiFe film having a film thickness of 8.0 nm on the soft magnetic layer as a seed layer.

Next, a DC magnetron sputtering method was used to stack Ru on the seed layer, forming an intermediate layer having a film thickness of 10 nm.

Next, a DC magnetron sputtering method was used to stack, on the intermediate layer, a $CoCrPtSiO_2$ film (first magnetic layer) having a film thickness of 10 nm, a Ru film (coupling control layer) having a film thickness of 0.2 nm, a $CoCrPtSiO_2$ film (second magnetic layer) having a film thickness of 3.0 nm, and a CoCrPtB film (third magnetic layer) having a film thickness of 6.0 nm, to form a four-layer structure magnetic recording layer.

Next, a plasma CVD apparatus was used to form a DLC film of thickness 2.0 nm.

In another plasma CVD apparatus of the same type as the plasma CVD apparatus described above, with a nitrogen gas flow rate at 50 sccm, a tetrafluoromethane gas flow rate at 40 sccm, and over a processing time of 1.0 second, nitriding treatment and fluoriding treatment of the surface of the DLC film were performed.

On the protective film formed in this way, a lubricating film was formed by using a dip method to apply a liquid lubricant, the principal part of which is a perfluoro polyether. Lubricant films were formed having four film thicknesses of 0.7 nm, 1.1 nm, 1.5 nm, and 1.8 nm.

Reading and Writing Method

In the present practical example, evaluations of electromagnetic transducing characteristics (SNR) were performed with the element portion of the magnetic head immersed in the lubricating film at depths of 0.3 nm, 0.7 nm, 1.1 nm, and 1.6 nm. The SNR was measured using a spin stand tester with a hybrid head, having a single-pole head for writing and a GMR type head for reading, under measurement conditions corresponding to a recording density of 500 $Gb/in^2$. The following equation was used to determine the SNR value from the signal output and noise output obtained.

$$SNR(dB) = 20 \times \log[(\text{signal output})/(\text{noise output})]$$

In the above equation, "log" means the common logarithm.

Further, the present invention differs from reading and writing methods in the art in which the magnetic head flies, in that because the element portion of the magnetic head is immersed in the lubricating film, there are concerns regarding wear of the element portion of the magnetic head. Hence a Burnishability test was performed to evaluate HDI reliability. In this method, after causing traveling for a fixed time with the element portion of a magnetic head in a state of immersion at various prescribed depths in the lubricating film, the amount of wear of the element portion of the magnetic head is measured; it is preferable that wear be 0.5 nm or less. The following method was used to measure the amount of wear of the element portion. First, the amount of protrusion when the element portion of the magnetic head is in contact with the protective film surface is measured. Next, after causing traveling for a fixed time in a state in which the element portion of the magnetic head is immersed at various prescribed depths in the lubricating film, the state is returned to the state in which there is no protrusion of the element portion of the magnetic head. Then the amount of protrusion when the element portion of the magnetic head is again brought into contact with the surface of the protective film is measured, and the increase in the amount of protrusion is taken to be the amount of wear.

Comparative Example 1

The methods of Practical Example 1 were used to evaluate the electromagnetic transducing characteristics (SNR) and HDI reliability (amount of wear of the element portion of the magnetic head) for a magnetic recording medium, manufactured using the method of Practical Example 1, when the film thickness of the lubricating film was 0.7, 1.1, 1.5, and 1.8 nm. At this time, evaluations were performed with the immersion depth of the element portion of the magnetic head in the lubricating film at −0.5 nm and 0 nm. Here "−0.5 nm" means that the element portion of the magnetic head was flying 0.5 nm above the surface of the lubricating film.

Results for Practical Example 1 and Comparative Example 1 appear in Table 1. In the table, the first rows for the two Examples indicate the distance d from the element portion of the magnetic head to the surface of the protective film. The distance d is the value obtained by subtracting the immersion depth from the lubricating film thickness. The second rows indicate the SNR, and values of 14.0 dB or higher were evaluated as satisfactory. The third rows indicate the amount of wear x of the element portion of the magnetic head in the burnishability tests; a value of 0.5 nm or less was judged to be satisfactory.

As a result, the shaded portions in Table 1 satisfied all the conditions for HDI reliability, electromagnetic transducing characteristics, and the other medium characteristics. These were cases in which the element portion of the magnetic head was positioned in the lubricating film, and the distance d from the element portion of the magnetic head to the protective film surface was 0.4 nm or greater and 0.8 nm or less. Even when the element portion of the magnetic head was positioned in the lubricating film, if the distance d between the element portion and the protective film was small at 0.2 nm, wear of the element portion was large, and the reliability requirement was not satisfied. None of the conditions in Comparative Example 1 in which the immersion depth was −0.5 nm were able to satisfy the SNR requirement. This is thought to be because the magnetic spacing between the magnetic head and the magnetic recording layer was increased. Further, under the condition of an immersion depth of 0 nm, head flight and travel were not stable and there were large fluctuations in the SNR, so that satisfactory reading and writing could not be performed.

TABLE 1

| | Immersion depth (nm) | | Lubricating film thickness (nm) | | | |
|---|---|---|---|---|---|---|
| | | | 0.7 | 1.1 | 1.5 | 1.8 |
| Comparative Example 1 | −0.5 | d | 1.2 | 1.6 | 2.0 | 2.3 |
| | | SNR | 13.6 | 13.2 | 12.8 | 12.5 |
| | | x | 0 | 0 | 0 | 0 |
| | 0 | d | 0.7 | 1.1 | 1.5 | 1.8 |
| | | SNR | 13.9 | 13.7 | 13.3 | 13.0 |
| | | x | 0.3 | 0 | 0 | 0 |
| Practical Example 1 | 0.3 | d | 0.4 | 0.8 | 1.2 | 1.5 |
| | | SNR | 14.4 | 14.0 | 13.6 | 13.3 |
| | | x | 0.5 | 0.2 | 0 | 0 |
| | 0.7 | d | 0 | 0.4 | 0.8 | 1.1 |
| | | SNR | 14.8 | 14.4 | 14.0 | 13.7 |
| | | x | 0.8 | 0.5 | 0.2 | 0 |
| | 1.1 | d | | 0 | 0.4 | 0.7 |
| | | SNR | | 14.8 | 14.4 | 14.1 |
| | | x | | 0.8 | 0.5 | 0.3 |
| | 1.6 | d | | | | 0.2 |
| | | SNR | | | | 14.6 |
| | | x | | | | 0.7 |

From the above, by means of the present invention it was possible to provide a method of writing and reading a magnetic recording medium to achieve improved electromagnetic transducing characteristics without impairing HDI reliability.

What is claimed is:

1. A method of reading and writing a magnetic recording medium using a magnetic head that has an element portion, the magnetic recording medium including a base, a metal film formed on the base, a protective film formed on the metal film, and a lubricating film formed on the protective film, the method comprising:

reading and writing the magnetic recording medium while positioning the element portion of the magnetic head in the lubricating film, including:

providing an acoustic emission (AE) element on the magnetic head, obtaining an AE signal from the AE element, and detecting, using the obtained AE signal, whether the element portion of the magnetic head is in contact with a surface of the lubricating film, is positioned in the lubricating film, or is in contact with a surface of the protective film, and obtaining a distance between the element portion and the surface of the lubricating film when the element portion of the magnetic head is positioned in the lubricating film.

2. The method of reading and writing a magnetic recording medium according to claim 1, wherein a film thickness of the lubricating film is 0.7 nm or greater and 1.8 nm or less.

3. The method of reading and writing a magnetic recording medium according to claim 2, wherein the distance between the element portion and the surface of the protective film when the element portion of the magnetic head is positioned in the lubricating film is 0.4 nm or greater and 0.8 nm or less.

4. The method of reading and writing a magnetic recording medium according to claim 1, further comprising protruding the element portion of the magnetic head.

5. The method of reading and writing a magnetic recording medium according to claim 4, wherein the protruding of the element portion is performed by thermal expansion.

* * * * *